United States Patent
Moorehead et al.

(10) Patent No.: US 11,320,830 B2
(45) Date of Patent: May 3, 2022

(54) PROBABILISTIC DECISION SUPPORT FOR OBSTACLE DETECTION AND CLASSIFICATION IN A WORKING AREA

(71) Applicant: Deere & Company, Moline, IL (US)

(72) Inventors: Stewart J. Moorehead, Moline, IL (US); Mark J. Cherney, Moline, IL (US)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 16/665,340

(22) Filed: Oct. 28, 2019

(65) Prior Publication Data

US 2021/0124364 A1    Apr. 29, 2021

(51) Int. Cl.
*G05D 1/02* (2020.01)
*B60W 30/095* (2012.01)
*G06V 20/58* (2022.01)

(52) U.S. Cl.
CPC ....... *G05D 1/0238* (2013.01); *B60W 30/0956* (2013.01); *G05D 1/0214* (2013.01); *G06V 20/58* (2022.01); *B60W 2300/17* (2013.01); *B60W 2554/00* (2020.02); *G05D 2201/0202* (2013.01)

(58) Field of Classification Search
CPC .............. G05D 1/0238; G05D 1/0214; G05D 2201/0202; G05D 1/024; G05D 1/0221; G05D 1/0223; G05D 1/0255; G05D 1/0276; G05D 2201/0213; B60W 30/0956; B60W 2300/17; B60W 2554/00; G06K 9/00805; G06K 9/6277; G06K 9/00496; G06K 9/00536; E02F 9/262; E02F 9/265; B60K 31/0008; B60K 2031/0016
See application file for complete search history.

(56) References Cited

U.S. PATENT DOCUMENTS

| | | |
|---|---|---|
| 6,247,538 B1 | 6/2001 | Takeda et al. |
| 6,292,725 B1 | 9/2001 | Kageyama et al. |
| 6,321,147 B1 | 11/2001 | Takeda et al. |

(Continued)

FOREIGN PATENT DOCUMENTS

| | | |
|---|---|---|
| AU | 2016376507 A1 | 5/2018 |
| AU | 2017305113 A1 | 11/2018 |

(Continued)

*Primary Examiner* — James J Lee
*Assistant Examiner* — Shon G Foley
(74) *Attorney, Agent, or Firm* — Lucian Wayne Beavers; Gary L. Montle; Patterson Intellectual Property Law, PC (57) ABSTRACT

Systems and methods disclosed herein provide probabilistic decision support regarding detected obstacles in a working area. Real-time data sets are collected from obstacle sensors associated with at least one self-propelled work vehicle, corresponding to detected presence/absence of obstacles at given locations within the working area. The received real-time data sets are integrated in data storage comprising a priori data sets corresponding to the working area, to generate one or more new a priori data sets. Probabilities are determined for the detected presence or absence of the obstacle, and for each of one or more obstacle categories, based on the received real-time data set and at least an a priori data set corresponding to the work vehicle's location. An output corresponding to at least a most likely of the determined probabilities is generated as feedback to a user interface, and/or relevant machine control units.

20 Claims, 4 Drawing Sheets

(56) References Cited

U.S. PATENT DOCUMENTS

| | | |
|---|---|---|
| 6,324,462 B1 | 11/2001 | Kageyama |
| 6,487,303 B1 | 11/2002 | Yamaguchi et al. |
| 6,539,294 B1 | 3/2003 | Kageyama |
| 6,546,115 B1 | 4/2003 | Ito et al. |
| 8,331,195 B1 | 12/2012 | Schumer et al. |
| 9,760,806 B1 | 9/2017 | Ning et al. |
| 10,037,033 B2 | 7/2018 | Yako et al. |
| 10,073,462 B2 | 9/2018 | Debreczeni |
| 10,093,289 B2 | 10/2018 | Lee |
| 10,108,867 B1 | 10/2018 | Vallespi-Gonzalez et al. |
| 10,144,353 B2 | 12/2018 | Karner et al. |
| 10,147,320 B1 | 12/2018 | Ellis |
| 10,150,414 B2 | 12/2018 | Myers et al. |
| 10,196,058 B2 | 2/2019 | Paris et al. |
| 10,202,115 B2 | 2/2019 | Stenneth |
| 10,205,457 B1 | 2/2019 | Josefsberg et al. |
| 10,239,446 B2 | 3/2019 | May et al. |
| 10,262,528 B2 | 4/2019 | Fields et al. |
| 2002/0044082 A1 | 4/2002 | Woodington et al. |
| 2002/0152079 A1 | 10/2002 | Furuta |
| 2004/0217851 A1 | 11/2004 | Reinhart |
| 2004/0252862 A1 | 12/2004 | Camus et al. |
| 2005/0154503 A1 | 7/2005 | Jacobs |
| 2005/0182540 A1 | 8/2005 | Sugiura et al. |
| 2005/0231339 A1 | 10/2005 | Kudo |
| 2007/0112513 A1 | 5/2007 | Mathevon et al. |
| 2007/0219720 A1 | 9/2007 | Trepagnier et al. |
| 2008/0046150 A1 | 2/2008 | Breed |
| 2009/0088979 A1 | 4/2009 | Koch |
| 2009/0187321 A1 | 7/2009 | Otsuka et al. |
| 2009/0229150 A1 | 9/2009 | Pfohl et al. |
| 2009/0259399 A1 | 10/2009 | Kotejoshyer et al. |
| 2009/0259400 A1 | 10/2009 | Coats et al. |
| 2009/0259401 A1 | 10/2009 | Edwards et al. |
| 2009/0268946 A1 | 10/2009 | Zhang et al. |
| 2010/0100324 A1 | 4/2010 | Caminiti et al. |
| 2010/0253489 A1 | 10/2010 | Cui et al. |
| 2010/0289632 A1 | 11/2010 | Seder et al. |
| 2011/0115615 A1 | 5/2011 | Luo et al. |
| 2011/0153169 A1 | 6/2011 | Peterson |
| 2011/0196568 A1 | 8/2011 | Nickolaou et al. |
| 2011/0254700 A1 | 10/2011 | Gharsalli et al. |
| 2012/0050024 A1 | 3/2012 | Taylor et al. |
| 2012/0130588 A1 | 5/2012 | Hukkeri |
| 2012/0130598 A1 | 5/2012 | Hukkeri et al. |
| 2012/0206336 A1 | 8/2012 | Bruder et al. |
| 2012/0218412 A1 | 8/2012 | Dellantoni et al. |
| 2012/0249342 A1 | 10/2012 | Koehrsen et al. |
| 2012/0271504 A1 | 10/2012 | Reiners et al. |
| 2012/0287277 A1 | 11/2012 | Koehrsen et al. |
| 2012/0326917 A1 | 12/2012 | Kiehne |
| 2012/0327261 A1 | 12/2012 | Tafazoli Bilandi et al. |
| 2013/0141581 A1 | 6/2013 | Mitsuta et al. |
| 2013/0147958 A1 | 6/2013 | Mitsuta et al. |
| 2013/0222573 A1 | 8/2013 | Onuma et al. |
| 2014/0000974 A1 | 1/2014 | Nilsson et al. |
| 2014/0035775 A1* | 2/2014 | Zeng ............... G01S 13/931 342/52 |
| 2014/0118533 A1 | 5/2014 | Chang |
| 2014/0203959 A1 | 7/2014 | Kriel et al. |
| 2014/0205139 A1 | 7/2014 | Kriel et al. |
| 2014/0236477 A1 | 8/2014 | Chen et al. |
| 2014/0266859 A1 | 9/2014 | Kurihara et al. |
| 2014/0347483 A1 | 11/2014 | Nakanishi et al. |
| 2014/0362220 A1 | 12/2014 | Izumikawa et al. |
| 2014/0375503 A1 | 12/2014 | Kurihara et al. |
| 2015/0037762 A1 | 2/2015 | Martin et al. |
| 2015/0049911 A1 | 2/2015 | Doettling et al. |
| 2015/0070498 A1 | 3/2015 | Kriel |
| 2015/0183370 A1 | 7/2015 | Nakanishi et al. |
| 2015/0210213 A1 | 7/2015 | Mitsuta et al. |
| 2015/0210279 A1 | 7/2015 | Agnew et al. |
| 2015/0307024 A1 | 10/2015 | Fukuda et al. |
| 2015/0326829 A1 | 11/2015 | Kurihara et al. |
| 2015/0343976 A1 | 12/2015 | Lim et al. |
| 2015/0346337 A1 | 12/2015 | Jung |
| 2015/0355333 A1 | 12/2015 | Ono et al. |
| 2016/0016512 A1 | 1/2016 | Masutani et al. |
| 2016/0059854 A1 | 3/2016 | Ohsugi et al. |
| 2016/0060826 A1 | 3/2016 | Berning et al. |
| 2016/0063864 A1 | 3/2016 | Ohsugi et al. |
| 2016/0114728 A1 | 4/2016 | Tan et al. |
| 2016/0120095 A1* | 5/2016 | Fujimoto ............ G05D 1/0219 701/24 |
| 2016/0137125 A1 | 5/2016 | Petrany et al. |
| 2016/0170411 A1 | 6/2016 | Wei et al. |
| 2016/0176338 A1 | 6/2016 | Husted et al. |
| 2016/0185346 A1 | 6/2016 | Awamori et al. |
| 2016/0202351 A1 | 7/2016 | Uotsu |
| 2016/0236616 A1 | 8/2016 | Kurihara et al. |
| 2016/0264133 A1 | 9/2016 | Ohsugi et al. |
| 2016/0264134 A1 | 9/2016 | Ohsugi et al. |
| 2016/0272172 A1 | 9/2016 | Lee |
| 2016/0282874 A1 | 9/2016 | Kurata et al. |
| 2016/0312446 A1 | 10/2016 | Pettersson et al. |
| 2016/0375830 A1 | 12/2016 | Karner et al. |
| 2017/0016210 A1 | 1/2017 | Kowatari et al. |
| 2017/0018070 A1 | 1/2017 | Onuma et al. |
| 2017/0057497 A1 | 3/2017 | Laur et al. |
| 2017/0113608 A1 | 4/2017 | Patel et al. |
| 2017/0135277 A1 | 5/2017 | Hiramatsu et al. |
| 2017/0146990 A1 | 5/2017 | Wang et al. |
| 2017/0180707 A1 | 6/2017 | Hsu et al. |
| 2017/0191243 A1 | 7/2017 | Sharp et al. |
| 2017/0205506 A1 | 7/2017 | Voorheis et al. |
| 2017/0220044 A1 | 8/2017 | Sakai et al. |
| 2017/0225680 A1 | 8/2017 | Huang et al. |
| 2017/0229019 A1 | 8/2017 | Ichinose et al. |
| 2017/0236422 A1 | 8/2017 | Naka et al. |
| 2017/0242436 A1 | 8/2017 | Creusot |
| 2017/0248439 A1 | 8/2017 | Sakai et al. |
| 2017/0267172 A1 | 9/2017 | Irby, Sr. |
| 2017/0285649 A1 | 10/2017 | Debreczeni |
| 2017/0286763 A1 | 10/2017 | Fukuda et al. |
| 2017/0301107 A1* | 10/2017 | Sasaki .................. B60R 1/00 |
| 2017/0349169 A1 | 12/2017 | Deshpande |
| 2017/0356994 A1 | 12/2017 | Wodrich et al. |
| 2017/0364072 A1 | 12/2017 | Yako et al. |
| 2017/0364759 A1 | 12/2017 | Creusot |
| 2018/0009378 A1 | 1/2018 | Myers et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0072313 A1 | 3/2018 | Stenneth |
| 2018/0074178 A1 | 3/2018 | Cook et al. |
| 2018/0074201 A1 | 3/2018 | Sakai et al. |
| 2018/0074506 A1 | 3/2018 | Branson |
| 2018/0081368 A1 | 3/2018 | Watanabe et al. |
| 2018/0105107 A1 | 4/2018 | Hassan-Shafique et al. |
| 2018/0107871 A1 | 4/2018 | Singh et al. |
| 2018/0204335 A1 | 7/2018 | Agata et al. |
| 2018/0210454 A1 | 7/2018 | Ready-Campbell et al. |
| 2018/0236985 A1 | 8/2018 | Kim et al. |
| 2018/0236986 A1 | 8/2018 | Kim et al. |
| 2018/0239991 A1 | 8/2018 | Weller et al. |
| 2018/0252810 A1 | 9/2018 | Uotsu |
| 2018/0273030 A1 | 9/2018 | Weldon et al. |
| 2018/0284787 A1 | 10/2018 | Naka et al. |
| 2018/0292840 A1 | 10/2018 | Sakai |
| 2018/0307921 A1 | 10/2018 | Vallespi-Gonzalez et al. |
| 2018/0322653 A1 | 11/2018 | Tatarnikov et al. |
| 2018/0326982 A1 | 11/2018 | Paris et al. |
| 2019/0011993 A1 | 1/2019 | Ette et al. |
| 2019/0025057 A1 | 1/2019 | Sakai et al. |
| 2019/0027028 A1 | 1/2019 | Fields et al. |
| 2019/0047488 A1 | 2/2019 | Lee et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |

(56) References Cited

U.S. PATENT DOCUMENTS

| | | | |
|---|---|---|---|
| 2019/0094857 A1 | 3/2019 | Jertberg et al. | |
| 2021/0254314 A1* | 8/2021 | Takata | E02F 9/264 |

FOREIGN PATENT DOCUMENTS

| | | |
|---|---|---|
| AU | 2017408956 A1 | 4/2019 |
| CA | 2744561 A1 | 12/2012 |
| CN | 102955938 A | 3/2013 |
| CN | 103057459 A | 4/2013 |
| CN | 202873034 U | 4/2013 |
| CN | 104655186 A | 5/2015 |
| CN | 204346505 U | 5/2015 |
| CN | 107244324 A | 10/2017 |
| CN | 206657493 U | 11/2017 |
| CN | 208460034 U | 2/2019 |
| DE | 19961731 A1 | 7/2001 |
| DE | 10144689 A1 | 3/2003 |
| DE | 102011017707 A1 | 10/2012 |
| DE | 102016012342 A1 | 4/2017 |
| DE | 102016215102 A1 | 12/2017 |
| DE | 102018003788 A1 | 11/2018 |
| DE | 102017216000 A1 | 3/2019 |
| EP | 717290 A2 | 6/1996 |
| EP | 2354316 B1 | 11/2012 |
| EP | 2524847 A1 | 11/2012 |
| EP | 3482503 A1 | 5/2019 |
| ES | 2663655 A1 | 4/2018 |
| GB | 2507769 A | 5/2014 |
| GB | 2567142 A | 4/2019 |
| JP | 11353593 A | 12/1999 |
| JP | 2002074595 A | 3/2002 |
| JP | 2008163719 A | 7/2008 |
| JP | 2008248613 A | 10/2008 |
| JP | 2010112100 A | 5/2010 |
| JP | 2010198519 A | 9/2010 |
| JP | 2010204821 A | 9/2010 |
| JP | 2016022804 A | 2/2016 |
| JP | 2016119559 A | 6/2016 |
| JP | 2017074870 A | 4/2017 |
| JP | 2017074871 A | 4/2017 |
| JP | 2017074873 A | 4/2017 |
| JP | 2017085370 A | 5/2017 |
| JP | 2017161467 A | 9/2017 |
| JP | 2017172223 A | 9/2017 |
| JP | 2018043599 A | 3/2018 |
| KR | 20020093659 A | 12/2002 |
| KR | 100531198 B1 | 11/2005 |
| KR | 20120140545 A | 12/2012 |
| KR | 20130021986 A | 3/2013 |
| KR | 20130042963 A | 4/2013 |
| KR | 101489836 B1 | 2/2015 |
| KR | 101566963 B1 | 11/2015 |
| KR | 20160091585 A | 8/2016 |
| KR | 20160121026 A | 10/2016 |
| KR | 101684095 B1 | 12/2016 |
| KR | 20170052713 A | 5/2017 |
| KR | 20170119059 A | 10/2017 |
| KR | 20180041525 A | 4/2018 |
| WO | 2016121688 A1 | 8/2011 |
| WO | 2014072730 A1 | 5/2014 |
| WO | 2015060218 A1 | 4/2015 |
| WO | 2017022262 A1 | 2/2017 |
| WO | 2017110159 A1 | 6/2017 |
| WO | 2018007995 A1 | 1/2018 |
| WO | 2018026021 A1 | 2/2018 |
| WO | 2018050945 A1 | 3/2018 |
| WO | 2018056125 A1 | 3/2018 |
| WO | 2018078054 A1 | 5/2018 |
| WO | 2018042567 A1 | 8/2018 |
| WO | 2018158642 A1 | 9/2018 |
| WO | 2018172849 A1 | 9/2018 |
| WO | 2018189952 A1 | 10/2018 |
| WO | 2018215833 A1 | 11/2018 |
| WO | 2019043446 A1 | 3/2019 |
| WO | 2019048011 A1 | 3/2019 |

* cited by examiner

PROBABILISTIC DECISION SUPPORT FOR OBSTACLE DETECTION AND CLASSIFICATION IN A WORKING AREA

FIELD OF THE DISCLOSURE

The present disclosure relates to self-propelled vehicles such as working machines having onboard obstacle detection systems, and more particularly systems and methods for supplementing conventional obstacle detection with probabilistic decision support based on a priori knowledge development and estimation.

BACKGROUND

Working machines as discussed herein may for example include excavator machines, loaders, and other equipment which modify the terrain or equivalent working environment in some way. These machines may have tracked or wheeled ground engaging units supporting the undercarriage from the ground surface, and may further include one or more working implements which are used to modify the terrain in coordination with movement of the machine. Various situations arise with such machines where the human operator needs to control the movements of the machine position and/or the relative positions of the working implements based on detected obstacles in the working area, which may or may not be visible to the operator.

Obstacle detection systems are conventionally known to provide feedback to the operator regarding detected obstacles in the working area. When creating an obstacle detection system, it is advantageous to have a system that can distinguish between different types of objects (e.g., moving or transient obstacles such as people or vehicles, or fixed obstacles such as structures or material), since the system may want to react differently to different types of objects in the environment. Accordingly, it is also desirable to accurately detect these different object classes, such that the system does not detect an object which is in fact not present, or fail to detect a present object, or still further assign an incorrect classification to an object which results in an improper response by the human operator or automated machine control system.

SUMMARY OF THE DISCLOSURE

The current disclosure provides improvements in the collection and implementation of data corresponding to working machine actions over time to improve obstacle detection and classification results.

In an embodiment, a method of probabilistic decision support regarding detected obstacles in a working area comprises: providing data storage comprising one or more a priori data sets corresponding to a working area; receiving real-time data sets from one or more obstacle sensors associated with at least one self-propelled work vehicle, the real-time data sets corresponding to a detected presence or absence of an obstacle at a given location within the working area; determining probabilities for the detected presence or absence of the obstacle, and for each of one or more obstacle categories, based on the received real-time data set and an a priori data set corresponding to the given location as a subset of the one or more a priori data sets corresponding to the working area, and generating an output corresponding to at least a most likely of the determined probabilities.

Another embodiment of the method may further comprise integrating the received real-time data sets in data storage comprising a priori data sets corresponding to the working area, to generate one or more new a priori data sets.

Another embodiment of the method may further comprise monitoring movements of one or more moveable work vehicle components comprising at least one of the work implements, and updating one or more of the one or more a priori data sets with data categorizing an obstacle at a location within the working area based on a predetermined sequence of movement for the one or more work vehicle components.

In another exemplary embodiment of the method, for updating the one or more of the one or more a priori data sets, a first obstacle is categorized based on a first predetermined sequence of movement, a second obstacle is categorized based on a second predetermined sequence of movement, and a work vehicle route is further categorized between the first and second obstacles. Based on a specified work task, one or more of the first obstacle and the second obstacle may be categorized as either a transient obstacle or a permanent obstacle.

Another embodiment of the method may further comprise predicting a work vehicle route based on monitored vehicle movement. An obstacle detection area may further be defined as a subset of the work area corresponding to the predicted work vehicle route. A priori data retrieval and processing may be dynamically limited with respect to a subset of the data storage based on the defined obstacle detection area.

Another embodiment of the method may further comprise, for predicted and previously traversed work vehicle routes lacking a categorized permanent obstacle, restricting subsequent determination of probabilities of the detected presence or absence of the obstacle only to transient obstacles.

In an embodiment, the output may be provided to a user interface located in or on the work vehicle; and/or a user computing device. One or more predicted obstacles and associated categories on the user interface may in some embodiments be highlighted based on the output. One or more decision support tools or user-manipulable controls may in some embodiments be highlighted based on the output, for prompting or facilitating manual regulation of work vehicle components as for example may comprise or otherwise be integrated with an obstacle collision avoidance or negotiation system.

In an embodiment, the output may include at least one control signal provided to a vehicle steering control unit, a vehicle implement positioning control unit, and/or a vehicle drive control unit, for automated regulation of associated work vehicle components as for example may comprise or otherwise be integrated with an obstacle collision avoidance or negotiation system.

Manual and automatic working machine control based on detected obstacles as discussed above is known in the art, and conventional control structure and methodology may be implemented but is not necessarily further described in the context of a present invention. A system and method as disclosed herein supplements, complements, or otherwise provides additional and valuable feedback as part of an obstacle detection system, whether for operator decision support or automated obstacle negotiation, or in other words regardless of the control response unless otherwise stated. The a priori data generation and implementation enables an obstacle detection system to more confidently determine probabilities corresponding for example to whether an obstacle is actually present, and/or what type of obstacle is most likely to be present where applicable, such that a response may be tailored appropriately and not entirely subjected as in the prior art to the uncertainties inherent to the particular obstacle sensing apparatus and operating conditions.

In an embodiment, any one of the aforementioned methods may be performed via a self-propelled work vehicle having one or more work implements for working a terrain, one or more obstacle sensors, data storage comprising one or more a priori data sets corresponding to a working area, and a controller communicatively linked to the one or more work implements, the one or more obstacle sensors, and the data storage.

In an embodiment, any one of the aforementioned methods may be performed via a system comprising a server network communicatively linked to a plurality of self-propelled vehicles, each of the self-propelled vehicles comprising at least one work implement for working a terrain and one or more obstacle sensors, and data storage comprising one or more a priori data sets corresponding to a working area, wherein for example the respective method is executed with respect to each of the self-propelled vehicles located in the working area.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
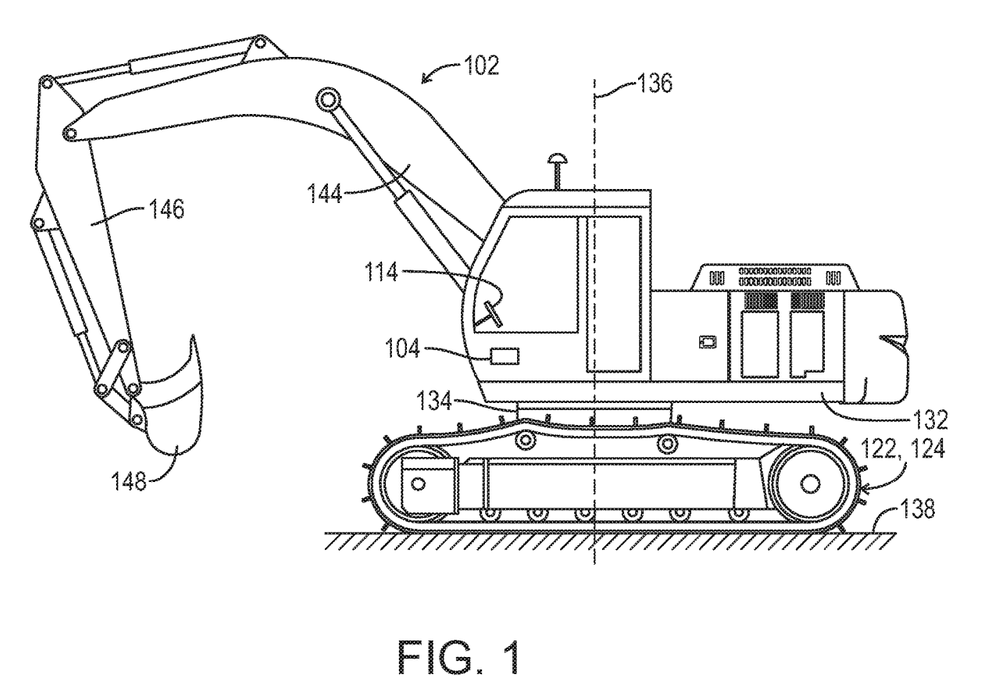
FIG. 1 is a side elevation view of a tracked excavator as a working machine incorporating an embodiment of a system as disclosed herein.

Referring now to the drawings and particularly to FIG. 1, a representative work vehicle is shown and generally designated by the number 100. FIG. 1 shows a tracked excavator machine 100. The systems disclosed herein are applicable to similar or otherwise equivalent vehicles, excavator machines, loaders, and other working machines of the type having one or more working implements 102 for modifying the proximate terrain. In certain embodiments, systems and methods as disclosed herein may also be applicable to vehicles lacking explicit work implements. Work vehicles as discussed herein may typically have tracked or wheeled ground engaging units supporting the undercarriage from the ground surface.

The illustrated and exemplary working machine 100 includes an undercarriage 122 including one or more tracked or wheeled ground engaging units 124 and at least one travel motor for driving the respective ground engaging units. A main frame 132 is supported by the undercarriage 122 via a swing bearing 134 such that the main frame 132 is pivotable about a pivot axis 136 relative to the undercarriage. The pivot axis 136 is substantially vertical when a ground surface 138 engaged by the ground engaging units 124 is substantially horizontal. A swing motor is configured to pivot the main frame 132 on the swing bearing 134 about the pivot axis 136 relative to the undercarriage 122.

A working machine as disclosed herein typically includes one or more working implements 102 which as illustrated for example in FIG. 1 may collectively define a boom assembly including a boom 144, an arm 146 pivotally connected to the boom 144, and a working tool 148. The boom 144 in the present example is pivotally attached to the main frame 132 to pivot about a generally horizontal axis relative to the main frame 132. The working tool in this embodiment is an excavator shovel or bucket 148 which is pivotally connected to the arm 146. The boom assembly 102 extends from the main frame 132 along a working direction of the boom assembly. The working direction can also be described as a working direction of the boom.

An operator's cab may be located on the main frame 132. The operator's cab and the one or more working implements 102 may both be mounted on the main frame so that the operator's cab faces in the working direction of the working implements. A control station including a user interface 114 may be located in the operator's cab.

Figure 2:
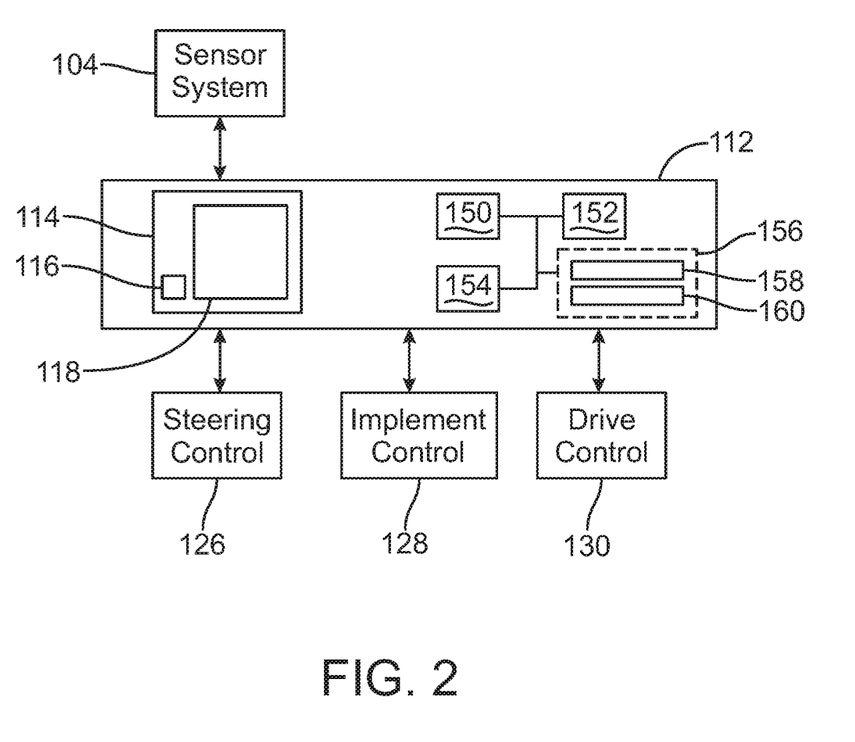
FIG. 2 is a block diagram representing an exemplary control system for the working machine of FIG. 1.

As schematically illustrated in FIG. 2, the working machine 100 includes a control system including a controller 112. The controller may be part of the machine control system of the working machine, or it may be a separate control module. The controller may include the user interface 114 and optionally be mounted in the operators cab at a control panel.

The controller 112 is configured to receive input signals from some or all of various sensors collectively defining a sensor system 104. Certain of these sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

Other sensors in the sensor system 104 more particularly refer to a group of sensors referred to herein as obstacle sensors 104. Various examples of obstacle sensors are conventionally known and may include laser scanners, thermal sensors, imaging devices, structured light sensors, ultrasonic sensors, and other optical sensors. The types and combinations of obstacle sensors may vary for a type of working machine, work area, and/or application, but generally are provided and configured to optimize recognition of obstacles in a working path of the vehicle.

The controller 112 may typically produce an output regarding obstacle detection and classification, as further described below, to the user interface 114 for display to the human operator. The controller may further or in the alternative generate control signals for controlling the operation of respective actuators, or signals for indirect control via intermediate control units, associated with a machine steering control system 126, a machine implement control system 128, and a machine drive control system 130.

The controller 112 includes or may be associated with a processor 150, a computer readable medium 152, a communication unit 154, data storage 156 such as for example a database network, and the aforementioned user interface 114 or control panel 114 having a display 118. An input/output device 116, such as a keyboard, joystick or other user interface tool, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller and external systems or devices, and/or support or provide communication interface with respect to internal components of the working machine. The communications unit may include wireless communication system components (e.g., via cellular modem, WiFi, Bluetooth or the like) and/or may include one or more wired communications terminals such as universal serial bus ports.

The data storage 156 as further described below may be configured to at least receive and store real-time data sets 158 and a prior data sets 160 in selectively retrievable form. Data storage as discussed herein may, unless otherwise stated, generally encompass hardware such as volatile or non-volatile storage devices, drives, memory, or other storage media, as well as one or more databases residing thereon.

Referring generally to FIGS. 1-4, exemplary modes of operation may further be described with respect to the aforementioned working machine. As previously noted, obstacle detection sensors, algorithms, and controls are conventionally known, but it can often be difficult to reliably distinguish an appropriate obstacle detection signal from the noise characteristic of typical working operations. An optimal obstacle detection system would not only be able to accurately detect the presence or absence of an object in the (actual or projected) working path of the machine, but also to distinguish between different types of objects (e.g., people, vehicles, structures) and provide appropriate feedback.

Embodiments of a decision support system and method as disclosed herein may more accurately detect the presence of an object and accurately assign it a category or classification through the use of "priors" or a priori knowledge development. An a priori data set in this context may refer generally to information the system has collected, generated, and/or derived, prior to performing the classification, regarding the probability that an object of a certain class is present in a certain location. It may be appreciated that improving the accuracy of these priors over time can also significantly improve the performance of the classification.

A priori data sets may further be generated as corresponding to a working area, or operating environment, for the working machines. A working area in one example may be predetermined, such as for example via defined boundaries, configurations, and the like. Alternatively, a working area may be defined generally with respect to a specific working machine location, such as an area surrounding and within a certain distance from the working machine. In certain embodiments, the system may accordingly generate a priori data sets with respect to a specific work area that may be traversed by multiple working machines, or a priori data sets may be generated with respect to a given fixed location that may be later classified as a work area for a given working machine based on its detected position.

As noted above, working machines may typically modify their environment in some way, for example in that loaders may move piles of material around or excavators may dig a hole in one location and pile dirt in another. An obstacle detection system as disclosed herein is directed in part to detect and classify these objects as holes or piles, not only for safety reasons but also for improved job automation in that it is important to provide feedback regarding where the machine is to load and unload material.

In certain embodiments as disclosed herein, a system and method may accordingly involve analyzing the motions of the working machine (e.g., the working implements) and inferring therefrom the presence of holes and piles that the machine is creating. This information is further implemented to establish or integrate with previously established a priori knowledge and create better priors for the classifier to detect and classify these elements correctly in the environment.

As one example, the system may be configured to remember places where a wheel loader boom is raised and the bucket drops, further inferring that the operator is dumping material in this location, and accordingly increasing the prior for presence of a "Material Pile" in that location. The pile may be designated as a certain type of location or fixed "destination" associated with later iterations of a predicted working machine route. Alternatively, the system may have prior knowledge of a machine project or job which includes filling a dump truck, wherein the system is configured to increase the prior for "Vehicle" in this particular location. The vehicle may be assigned a certain type of location or transient "destination" in this context with respect to later iterations of a predicted working machine route.

As another example associated with a wheeled or tracked excavator as the working machine, the system may be configured to monitor and identify positions where the boom is down and the bucket is lower than the tracks, and accordingly to increase the prior for "Hole" in that location. The hole may be designated as for example another certain type of location or fixed "origin" associated with later iterations of a predicted working machine route.

One of skill in the art may appreciate that various additional or alternative combinations of machine and/or machine implement movements may be predetermined in association with relevant designations and implemented by the system for improving priors and associated classifications, depending for example on the type of working machine, the type of working area, the type of project, etc.

In addition to monitoring and analyzing machine implement motions to improve priors, the system may further (or in the alternative) consider the driving paths taken by the working machine to establish or further develop a priori knowledge for a "Driveability" class. In one example associated with a loader, the working machine may perform a series of movements such as driving into a pile, picking up material, backing up and then, while turning, driving forward towards a dump truck, unloading, reversing while turning, and then repeating the same. The system as disclosed herein can develop a priori knowledge regarding the working area by monitoring the motions of the working machine for a short period of time.

For example, the system may determine that the areas the working machine has driven over repeatedly are of the class "Driveable" and that the system may permissibly restrict subsequent analysis to only those objects that could move into those spaces (e.g., "transient" obstacles such as people and vehicles, rather than "fixed" obstacles such as buildings or equivalent structures).

Further, the system may be configured to accurately predict a working machine route or path, based on the knowledge that the working machine recently and successfully drove along that path or otherwise through a series of locations. The system may accordingly determine a most likely portion (subset) of the working area to be traversed by the working machine and restrict the focus of the obstacle detection system generally with respect to that subset of the working area, or even more particularly and sequentially with respect to specific locations along the predicted route, rather than the larger working area as a whole. This may in many cases substantially reduce the search space and associated data processing requirements of the system, thereby allowing the system to run much more quickly and accurately.

Figure 3:
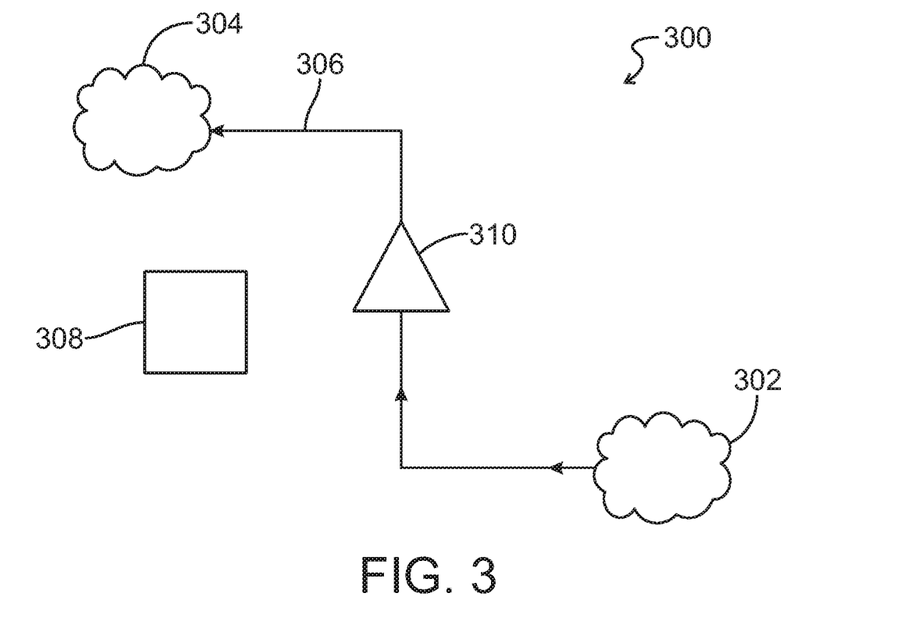
FIG. 3 is an overhead schematic view of an exemplary working area including obstacles and a working machine.

Referring for example to FIG. 3, a system as disclosed herein may be configured to detect a first obstacle 302 in a working area 300 and classify the obstacle based on a first combination of one or more monitored working machine movements as a material loading "origin," and further detect a second obstacle 304 in the working area and classify the obstacle based on a second combination of one or more monitored working machine movements as a material unloading "destination." The system may further define a working machine route 306 between the first and second obstacles based on a monitored and uneventful traverse of said route. Accordingly, in an embodiment of a method as disclosed herein, the system may (depending for example on a particular job or other condition) predict that the working machine will proceed along the defined route and restrict obstacle detection data processing, and the associated a priori data retrieval from storage, to only a portion of the overall work area that corresponds to the predicted route. This may for example exempt previously detected and classified "permanent" (or otherwise e.g. "highly likely" to be permanent) obstacles 308 that do not correspond to or overlap with the predicted route. This may further assist the system in classifying an object 310 that is detected along the predicted route as being a "transient" (or "highly likely" to be transient) obstacle (e.g., human or vehicle), and further enabling optimized feedback and/or control response based thereon.

In some embodiments an obstacle detection method including a prior data set generation, selective data retrieval and processing, and feedback or control response may be implemented from a controller or machine control system associated with an individual working machine.

Figure 4:
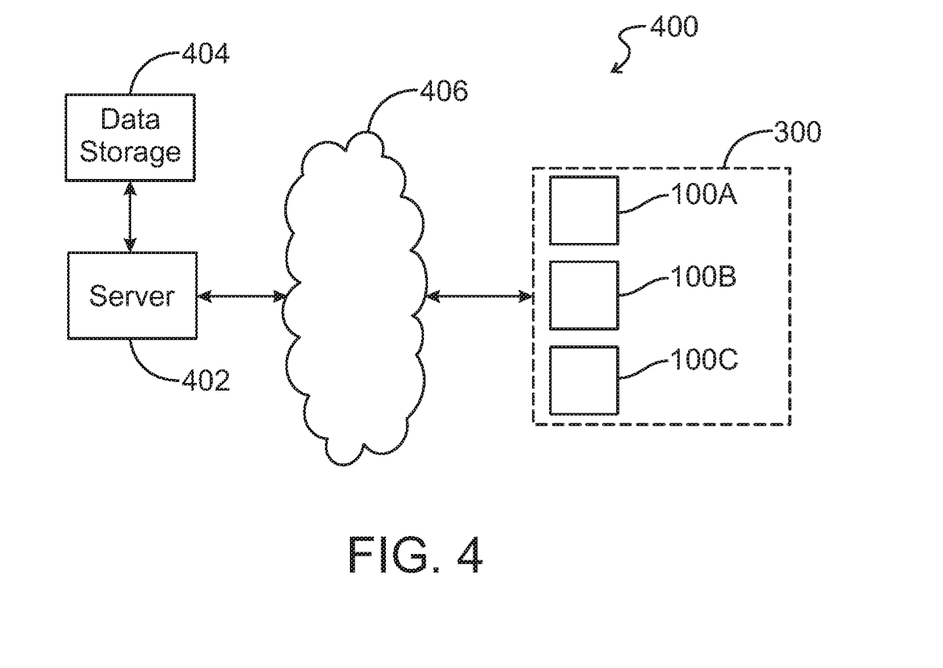
FIG. 4 is a graphical diagram representing an embodiment of a distributed system as disclosed herein.

In other embodiments as illustrated for example in FIG. 4, a distributed obstacle detection system 400 may include one or more remote servers 402 linked to working machines 100a, 100b, 100c within or associated with a work area 300.

The server may be configured for bidirectional communications with the working machines via a communications network 406 to receive obstacle detection data sets from the machines, and further to communicate with data storage 404 for storing and selectively retrieving a priori data based at least in part on the raw data from the machines.

The term "communications network" as used herein with respect to data communication between two or more entities (e.g., server, controller, user computing device) or otherwise between communications network interfaces associated with two or more entities may refer to any one of, or a combination of any two or more of, telecommunications networks (whether wired, wireless, cellular or the like), a global network such as the Internet, local networks, network links, Internet Service Providers (ISP's), and intermediate communication interfaces.

The distributed system as disclosed herein may thereby generate a priori data sets for collective data processing and feedback based on inputs from a number of working machines assigned to the same work area. In alternative embodiments of this structure, various data processing steps may optionally be designed for execution at the server level, at the local working machine controller level, or a combination of the two.

Figure 5:
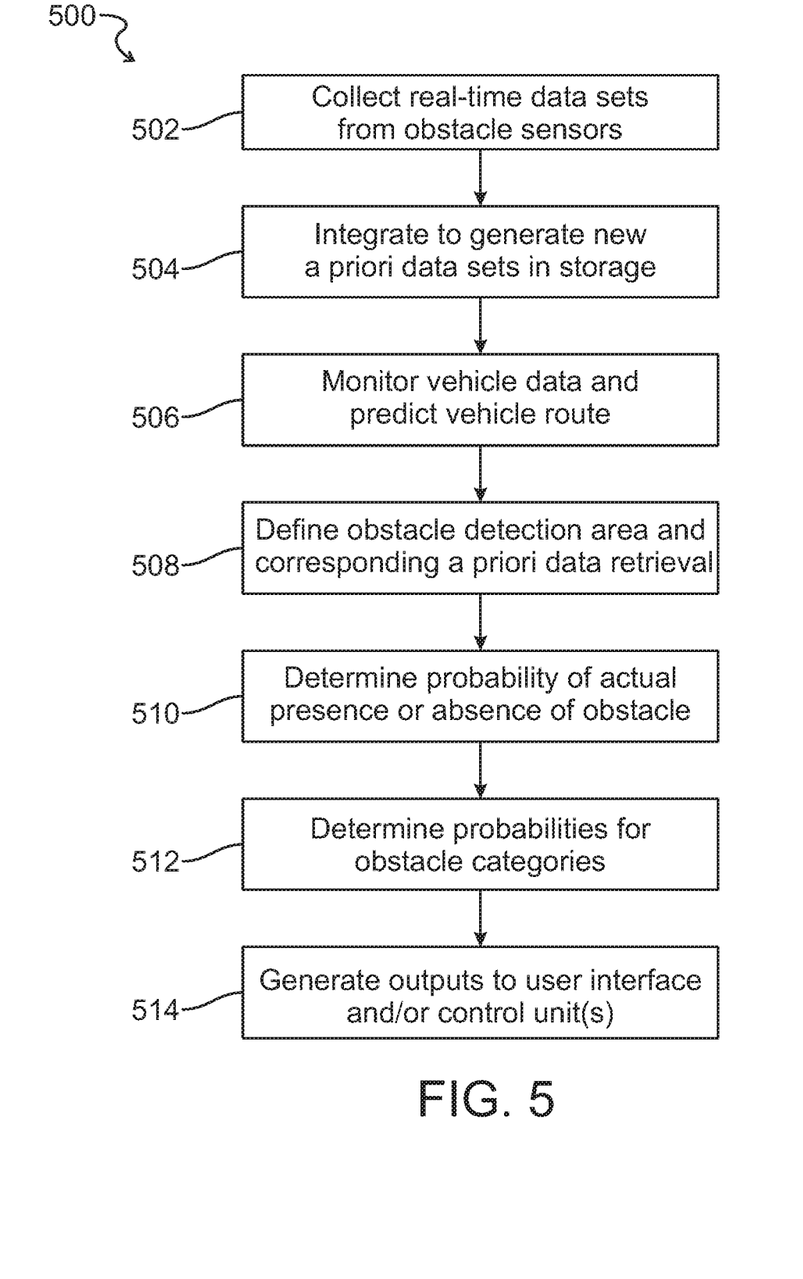
FIG. 5 is a flowchart representing an exemplary embodiment of a method as disclosed herein.

FIG. 5 represents an exemplary embodiment of a method of operation 500 as disclosed herein. Unless otherwise expressly noted, various steps of the method may be performed at the level of a local working machine controller, at the level of a computing device associated with an operator of a working machine or other user, and/or at the level of one or more remote servers communicatively linked thereto.

The method 500 may begin in step 502 with the collection of real-time data sets from one or more obstacle sensors associated with a working machine. The collected data sets may be stored in data storage, for example in predetermined database locations for selective data retrieval and processing in later steps.

As previously noted, the "obstacle sensors" available for system implementation are not inherently limited in scope and may encompass various conventionally known sensors or combinations of sensors for their intended purpose, or as otherwise may be understood by one of skill in the art to be applicable for implementation within the present disclosure.

The "real-time" data sets as referred to herein are also not inherently limited in scope unless otherwise stated, and may encompass raw data signals that are transmitted directly from the sensors in real-time for generation of data sets at the controller level, sets of raw data signals that are collectively transmitted from the sensors to the controller after predetermined periods of time rather than instantaneously, event-driven data signals that are transmitted from the sensors to the controller based on threshold or non-threshold detection events, and the like.

The method 500 may continue in step 504 by integrating the collected obstacle detection data sets to improve upon any known priors, thereby generating new a priori data sets in data storage.

The method 500 may optionally continue in steps 506 and 508 by monitoring movements of a working machine over time, predicting a path or route to be traversed by the working machine, and further defining an obstacle detection area for corresponding a priori data retrieval and processing. As previously noted, certain embodiments including such steps may substantially decrease the processing time required by the method, by requiring only a limited subset of the overall work area to be substantively reviewed at a given time.

The method 500 may continue in step 510 by determining a probability of an actual presence (or absence) of an obstacle at a given location, and in step 512 by determining the respective probabilities for categories of said obstacle. As one example, data signals received from a conventional obstacle sensor (or combination of obstacle sensors) may indicate that an obstacle has been detected. A priori data retrieval and processing, further involving for example integration of the new data signals, may be used to determine a likelihood that an obstacle is actually present. In contexts where the raw data signals may be relatively noisy in nature, implementation of priors may confirm that an obstacle is indeed present, or instead may prevent (or at least dampen or delay) inappropriate feedback or control response by determining that such an obstacle is relatively unlikely.

Such steps may for example include generating state vectors corresponding to a condition or category (e.g., the presence or absence of an obstacle), wherein transition functions or the like may be used to generate and update over time the probability values associated with the respective vectors. With repeated traverse of a given working machine route, the system and method may strengthen the priors associated with no fixed obstacle along the given route, without expressly eliminating for example the possibility of a transient obstacle entering the route. Accordingly, the probability values associated with the state vectors may reflect these relative distinctions, and if an obstacle is later indicated via signals from the obstacle detection sensors the system may infer a low probability that a fixed obstacle is present, but that there may be a possibility of a transient obstacle along the route.

Generally speaking, a priori knowledge development and implementation as discussed above may be primarily based on detected movements of the working vehicle and/or associated work implements, and therefore not relying on information from the obstacle sensors themselves to classify the probabilities that for example an obstacle of a certain type is present. However, data from the obstacle detection sensors may still be integrated in various embodiments and/or machine learning contexts, such as for example where the system may recognize false positive indications over time from a particular obstacle sensor at a particular location. The system may further learn over time to treat signals from certain obstacle detection sensors as being more or less reliable in context, such as for example at particular locations in the work area, or in proximity to a previously traversed vehicle route, etc.

In certain embodiments, the a priori data sets corresponding to a work area may be generated solely or primarily based on learned information over time with respect to detected movements of the work vehicles and/or implements.

Alternatively, the a priori data sets may integrate predetermined information regarding the work area such as for example mapped topographical information, or such predetermined information may be separately provided in data storage for integration by the machine controller or server with respect to the obstacle detection sensor data and the a priori data.

The method 500 may continue in step 514 by generating one or more outputs to a user interface (e.g., control panel within the operator cab, mobile computing device, remote display) and/or to control units associated with the working machine. The outputs may be associated with a highest probability with respect to state vectors in a given relationship, such as for example whether an obstacle is present or absent (or if the system is uncertain regarding the same) in close proximity to the working machine, or whether a detected obstacle is fixed or transient, human or machine, etc.

In one context, the outputs are for display purposes only, and are presented to the human operator as decision support for a manual control response based on a more accurate representation of potential obstacles in the path of the working machine.

In another context, the outputs may be provided for automated control response, and more particularly to enable, disable, dampen, etc., a control response that may otherwise be automatically provided based on the raw obstacle detection signals. For example, control signals or commands may be generated for regulating obstacle avoidance to a vehicle steering system, a vehicle drive system (e.g., for braking and/or propulsion), or the like.

Uncertainty in the probability values generated by the system may be reflected in the outputs as well, such as for example where the outputs are weighted as part of a separate algorithm for control purposes, or where the operator may be presented with displayed results that indicate a potential obstacle but reflect the relative uncertainty or lack of confidence. For example, a certain output may be provided to regulate control of the work vehicle if the system determines that an obstacle is highly likely to be present in the vehicle's path, whereas a separate output may be provided if the system is uncertain regarding the state of a detected obstacle, such that a different control response is prudent or otherwise required by the work vehicle.

Thus it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled work vehicle having one or more work implements for working a terrain, the work vehicle comprising:
   one or more obstacle sensors;
   data storage comprising one or more a priori data sets corresponding to a working area; and
   a controller communicatively linked to the one or more work implements, the one or more obstacle sensors, and the data storage, and configured to
      monitor movements of one or more moveable work vehicle components comprising at least one of the work implements,
      update one or more of the one or more a priori data sets with data categorizing an obstacle at a location within the working area based on a predetermined sequence of movement for the one or more work vehicle components,
      receive a real-time data set from the one or more obstacle sensors corresponding to a detected presence or absence of an obstacle at a given location within the working area,
      determine probabilities of an actual presence or absence of the obstacle, and for each of one or more obstacle categories, based on the received real-time data set and an a priori data set corresponding to the given location as a subset of the one or more a priori data sets corresponding to the working area, and
generate an output corresponding to at least a most likely of the determined probabilities.

2. The work vehicle of claim 1, wherein the controller is further configured to
integrate the real-time data set or data derived therefrom into the data storage to generate a new one or more a priori data sets.

3. The work vehicle of claim 1, wherein for updating the one or more of the one or more a priori data sets:
a first obstacle is categorized based on a first predetermined sequence of movement,
a second obstacle is categorized based on a second predetermined sequence of movement, and
a work vehicle route is further categorized between the first and second obstacles.

4. The work vehicle of claim 3, wherein the controller is further configured based on a specified work task to categorize one or more of the first obstacle and the second obstacle as either a transient obstacle or a permanent obstacle.

5. The work vehicle of claim 4, wherein the controller is configured to predict a work vehicle route based on monitored vehicle movement.

6. The work vehicle of claim 5, wherein the controller is configured to define an obstacle detection area as a subset of the work area corresponding to the predicted work vehicle route, and to dynamically limit a priori data retrieval and processing with respect to a subset of the data storage based on the defined obstacle detection area.

7. The work vehicle of claim 5, wherein the controller is configured, for predicted and previously traversed work vehicle routes lacking a categorized permanent obstacle, to restrict subsequent determination of probabilities of the detected presence or absence of the obstacle only to transient obstacles.

8. The work vehicle of claim 1, wherein the output is provided to a user interface located in or on the work vehicle.

9. The work vehicle of claim 8, wherein the user interface is configured to highlight one or more predicted obstacles and associated categories based on the output from the controller.

10. The work vehicle of claim 1, wherein the output includes at least one control signal provided to one or more of a vehicle steering control unit, a vehicle implement positioning control unit, and a vehicle drive control unit, for regulation of associated work vehicle components, and
the one or more of the vehicle steering control unit, the vehicle implement positioning control unit, and the vehicle drive control unit are configured to regulate the associated work vehicle components based at least in part on the at least one control signal.

11. A system comprising:
a server network communicatively linked to a plurality of self-propelled vehicles, each of the self-propelled vehicles comprising at least one work implement for working a terrain and one or more obstacle sensors; and
data storage comprising one or more a priori data sets corresponding to a working area;
wherein the server is configured to
monitor movements, for each of the work vehicles, of one or more moveable work vehicle components comprising at least one of the work implements,
update one or more of the one or more a priori data sets with data categorizing an obstacle at a location within the working area based on a predetermined sequence of movement for the one or more work vehicle components,
receive real-time data sets from the plurality of self-propelled work vehicles, the real-time data sets corresponding to a detected presence or absence of an obstacle at a given location within the working area,
determine probabilities for an actual presence or absence of the obstacle, and for each of one or more obstacle categories, based on the received real-time data set and an a priori data set corresponding to the given location as a subset of the one or more a priori data sets corresponding to the working area, and
generate an output to the respective work vehicle corresponding to at least a most likely of the determined probabilities.

12. The system of claim 11, wherein for updating the one or more of the one or more a priori data sets:
a first obstacle is categorized based on a first predetermined sequence of movement,
a second obstacle is categorized based on a second predetermined sequence of movement, and
a work vehicle route is further categorized between the first and second obstacles, and
wherein the server is further configured based on a specified work task for the respective work vehicle to categorize one or more of the first obstacle and the second obstacle as either a transient obstacle or a permanent obstacle.

13. The system of claim 12, wherein the server is configured to
predict a work vehicle route based on monitored vehicle movement, and
define an obstacle detection area as a subset of the work area corresponding to the predicted work vehicle route, and to dynamically limit a priori data retrieval and processing with respect to a subset of the data storage based on the defined obstacle detection area.

14. The system of claim 13, wherein the server is configured, for predicted and previously traversed work vehicle routes lacking a categorized permanent obstacle, to restrict subsequent determination of probabilities of the detected presence or absence of the obstacle only to transient obstacles.

15. A method of probabilistic decision support regarding detected obstacles in a working area, the method comprising:
receiving real-time data sets from one or more obstacle sensors associated with at least one self-propelled work vehicle, the real-time data sets corresponding to a detected presence or absence of an obstacle at a given location within the working area;
integrating the received real-time data sets in data storage comprising a priori data sets corresponding to the working area, to generate one or more new a priori data sets;
determining probabilities for the detected presence or absence of the obstacle, and for each of one or more obstacle categories, based on the received real-time data set and an a priori data set corresponding to the given location as a subset of the one or more a priori data sets corresponding to the working area;
generating an output corresponding to at least a most likely of the determined probabilities;
monitoring movements of one or more moveable work vehicle components comprising at least one work implement of the work vehicle; and updating one or more of the one or more a priori data sets with data categorizing an obstacle at a location within the working area based on a predetermined sequence of movement for the one or more work vehicle components.

16. The method of claim 15, wherein for updating the one or more of the one or more a priori data sets:
   a first obstacle is categorized based on a first predetermined sequence of movement,
   a second obstacle is categorized based on a second predetermined sequence of movement, and
   a work vehicle route is further categorized between the first and second obstacles; and
   wherein based on a specified work task one or more of the first obstacle and the second obstacle are categorized as either a transient obstacle or a permanent obstacle.

17. The method of claim 16, further comprising:
   predicting a work vehicle route based on monitored vehicle movement;
   defining an obstacle detection area as a subset of the work area corresponding to the predicted work vehicle route; and
   dynamically limiting a priori data retrieval and processing with respect to a subset of the data storage based on the defined obstacle detection area.

18. The method of claim 17, further comprising:
   for predicted and previously traversed work vehicle routes lacking a categorized permanent obstacle, restricting subsequent determination of probabilities of the detected presence or absence of the obstacle only to transient obstacles.

19. The method of claim 15, wherein the output is provided to a user interface located in or on the work vehicle, the method further comprising:
   highlighting one or more predicted obstacles and associated categories on the user interface based on the output.

20. The method of claim 15, wherein the output includes at least one control signal provided to one or more of a vehicle steering control unit, a vehicle implement positioning control unit, and a vehicle drive control unit, for regulation of associated work vehicle components, the method further comprising:
   regulating, via the one or more of the vehicle steering control unit, the vehicle implement positioning control unit, and the vehicle drive control unit, the associated work vehicle components based at least in part on the at least one control signal.

* * * * *